United States Patent
Bergsten

(10) Patent No.: US 7,328,529 B2
(45) Date of Patent: Feb. 12, 2008

(54) MOWER CONVERTIBLE INTO A TRACKED IMPLEMENT AND VICE VERSA

(75) Inventor: Rex R. Bergsten, Burnsville, MN (US)

(73) Assignee: The Toro Company, Bloomington, MN (US)

( * ) Notice: Subject to any disclaimer, the term of this patent is extended or adjusted under 35 U.S.C. 154(b) by 171 days.

(21) Appl. No.: 11/324,795

(22) Filed: Jan. 3, 2006

(65) Prior Publication Data

US 2007/0151220 A1    Jul. 5, 2007

(51) Int. Cl.
*E01H 5/00*     (2006.01)
*E01H 6/00*     (2006.01)

(52) U.S. Cl. ........................................ 37/241

(58) Field of Classification Search ................ 37/241, 37/243; 172/145, 15; 180/9.5, 14.4; 305/132; 56/2

See application file for complete search history.

(56) References Cited

U.S. PATENT DOCUMENTS

| | | | |
|---|---|---|---|
| 3,720,048 A * | 3/1973 | Grubb et al. ................. | 56/15.9 |
| 3,867,992 A * | 2/1975 | Waterman ................... | 180/14.4 |
| 3,882,615 A | 5/1975 | Williams | |
| 3,884,019 A * | 5/1975 | Gerzanich ................... | 56/12.7 |
| 4,532,725 A * | 8/1985 | Trejo et al. ................... | 37/243 |
| 5,520,253 A | 5/1996 | Kesting | |
| 6,941,735 B1 | 9/2005 | Tamas | |
| 7,040,426 B1 * | 5/2006 | Berg ........................... | 180/9.5 |
| 7,069,711 B1 * | 7/2006 | Connell et al. ................ | 56/249 |
| 7,134,278 B2 * | 11/2006 | Sakikawa ...................... | 60/484 |
| 2003/0108414 A1 * | 6/2003 | Walto et al. ................. | 414/685 |
| 2005/0036876 A1 * | 2/2005 | Walto et al. ................. | 414/724 |

* cited by examiner

*Primary Examiner*—Árpád Fábián Kovács
(74) *Attorney, Agent, or Firm*—James W. Miller

(57) ABSTRACT

This invention relates to a mower and a tracked implement that convert from one to the other by coupling a mower unit or a tracked unit to a common drive unit. The drive unit is thus used in both products to provide cost savings in the purchase of the equipment. In the tracked unit, a cab for enclosing the operator's station is part of the tracked unit and gets mounted to the drive unit when the tracked unit is coupled to the drive unit. A pair of idlers rotate on pivot axes that are fixed relative to a pivotal idler support that carries the idlers. The pivot point for the idler support is chosen to prevent track elongation when the tracked unit climbs obstructions such as a curb. In the mower unit, a relatively heavy cutting deck is used and spring biased weight transfer arms transfer some of the deck weight to the mower frame.

22 Claims, 13 Drawing Sheets

MOWER CONVERTIBLE INTO A TRACKED IMPLEMENT AND VICE VERSA

TECHNICAL FIELD

This invention relates generally to the field of outdoor power equipment and to a mower that is convertible to a tracked implement and vise versa. More particularly, this invention relates to how the mower and tracked implement convert using a common drive unit and to various features of the mower and tracked implement.

BACKGROUND OF THE INVENTION

In the field of outdoor power equipment, riding mowers are known for cutting large areas of grass. Such mowers typically comprise a frame carrying a prime mover and a cutting deck mounted to the frame. The frame is supported for rolling over the ground by a pair of front caster wheels and a pair of rear drive wheels that are driven in some fashion from the prime mover. The drive wheels are often independently drivable in forward and reverse to provide zero radius turn (ZRT) capability. An operator is carried on a seat provided on the frame and operates the drive wheels and steers the frame using various controls adjacent the seat.

As can be appreciated, the owner of such a mower has a substantial capital investment in the mower. Yet, in northern climates, the mower may not be used year round, but can sit idle during the winter. It would be desirable if the mower could effectively do double duty and be customarily used for winter snow removal operations. This would make the purchase of such a mower more cost effective and easier to justify.

Attempts have been made in the past to adapt a mower for snow removal by mounting a snowblower or snowplow on the front of the mower. If the snowblower is powered, a drive belt or other drive system would extend from the mower to the snowblower to power the snowblower. However, the basic drive system of the mower is not changed. In other words, the weight distribution and traction characteristics that were designed into the mower to give optimum performance as a mower are not changed merely by adding a snowblower or snowplow to the front of the mower.

The traction characteristics of a riding mower might work adequately on a relatively dry surface and allow the mower to push a snowblower or snowplow. But, these are not the surface conditions experienced when snow removal is needed. The ground surface then is normally snowy and/or icy. Thus, the tractive ability of a mower, particularly of a large riding mower carrying a seated operator, is not ideal or well suited for operating on such a slick surface.

Using a normal riding mower for snow removal operations often results in a snow removal product that does not perform well and that tends to lose traction. As mentioned above, the mower's traction system is not designed for snowy conditions. Moreover, when a snowblower or rotary brush or the like is added to the front of a mower, the added weight of this front mounted attachment tends to lift the drive wheels of the mower off the ground, particularly when the attachment is lifted up above the ground by some type of lift and lower system. In this situation where the rear drive wheels are lifted upwardly relative to the ground by the weight of the attachment, traction can be reduced so much that climbing a curb or driving the mower onto a trailer becomes very difficult or impossible.

Accordingly, dedicated, single purpose, tracked snow removal machines have been developed for clearing snow. The owner can purchase such machines for use in snow removal operations during the winter. However, this does not solve the problem of cost effectiveness. The snow removal machines sit idle during the summer, and the mower sits idle during the winter. Essentially, the owner must purchase and maintain two sets of equipment.

Thus, there is a need in the art for a product that would convert between a mower and a tracked implement and provide optimum traction and weight distribution in either form. This would be cost effective and yet give good operational results whether mowing or using the tracked implement for snow removal or some other non-grass mowing operation.

In using a machine of the type contemplated, whether in the mower or tracked implement form, it will often be necessary to climb small obstructions such as a curb. The operator will often drive the machine up over a curb or off a curb as the machine is transported from one area to the next. This presents various problems to a tracked implement. For example, as a tracked implement climbs a curb, some of the track support idlers or drive members will be up on top of the curb while others will still be on level ground. This will stretch or elongate the track and quickly cause the track to fail.

Tracked implements often solve the problem of track elongation by using idlers that are spring biased to accommodate the change in track length. However, this is a relatively complicated and costly track suspension system that is difficult to maintain and keep clear in winter operations. If a mower is to convert to a tracked implement, it would be desirable to have a simple, durable and effective way of solving the problem of track elongation.

Finally, in considering the operation of many known mowers of the type under consideration, the cutting deck is suspended from the frame of the mower to follow the contours of the ground independently of the mower. This is best done with a relatively light cutting deck. However, light cutting decks are not extremely durable and often wear quickly during operation.

One can attempt to improve the durability of a cutting deck by increasing the weight of the deck using thicker and stronger materials to form the deck. Such heavier decks, while more durable, tend to exhibit poorer ground following characteristics. For example, in the lowest or lower height of cut settings, such heavier decks will dig or plow into the ground despite using anti-scalp rollers, wheels or skids on the decks. This causes the cutting blades carried on the decks to scalp the turf. It would be desirable to have a relatively heavy cutting deck that still exhibits good ground following characteristics.

SUMMARY OF THE INVENTION

One aspect of this invention relates to a mower that converts into a tracked implement. The invention comprises a drive unit which comprises a drive frame, a prime mover carried on the drive frame, an operator's station on the drive frame for carrying an operator, a pair of ground engaging drive wheels on the drive frame with one drive wheel located on each side of the drive frame for driven rotation about a common rotational drive axis, and a control system on the drive frame adjacent the operator's station for operating the drive wheels. A mower unit is provided which comprises a mower frame, at least one ground engaging support wheel carried on the mower frame, and a grass cutting unit carried on the mower frame. A tracked unit is provided which comprises a track frame, a plurality of rotatable support idlers carried on the track frame with at least support one idler located on each side of the track frame, a device carried on the track frame to perform a ground or turf grooming or working operation other than grass cutting, and a pair of endless ground engaging tracks with one track located adjacent each side of the track frame. Each track is entrained around and connects a rotatable drive member carried on the drive frame and located on the drive axis on one side of the drive frame to a support idler on a corresponding side of the track frame. Either the mower unit or the tracked unit are alternatively usable with the drive unit to provide, respectively, either a mower for cutting grass or a tracked implement for performing the non-grass cutting ground or turf grooming or working operation.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
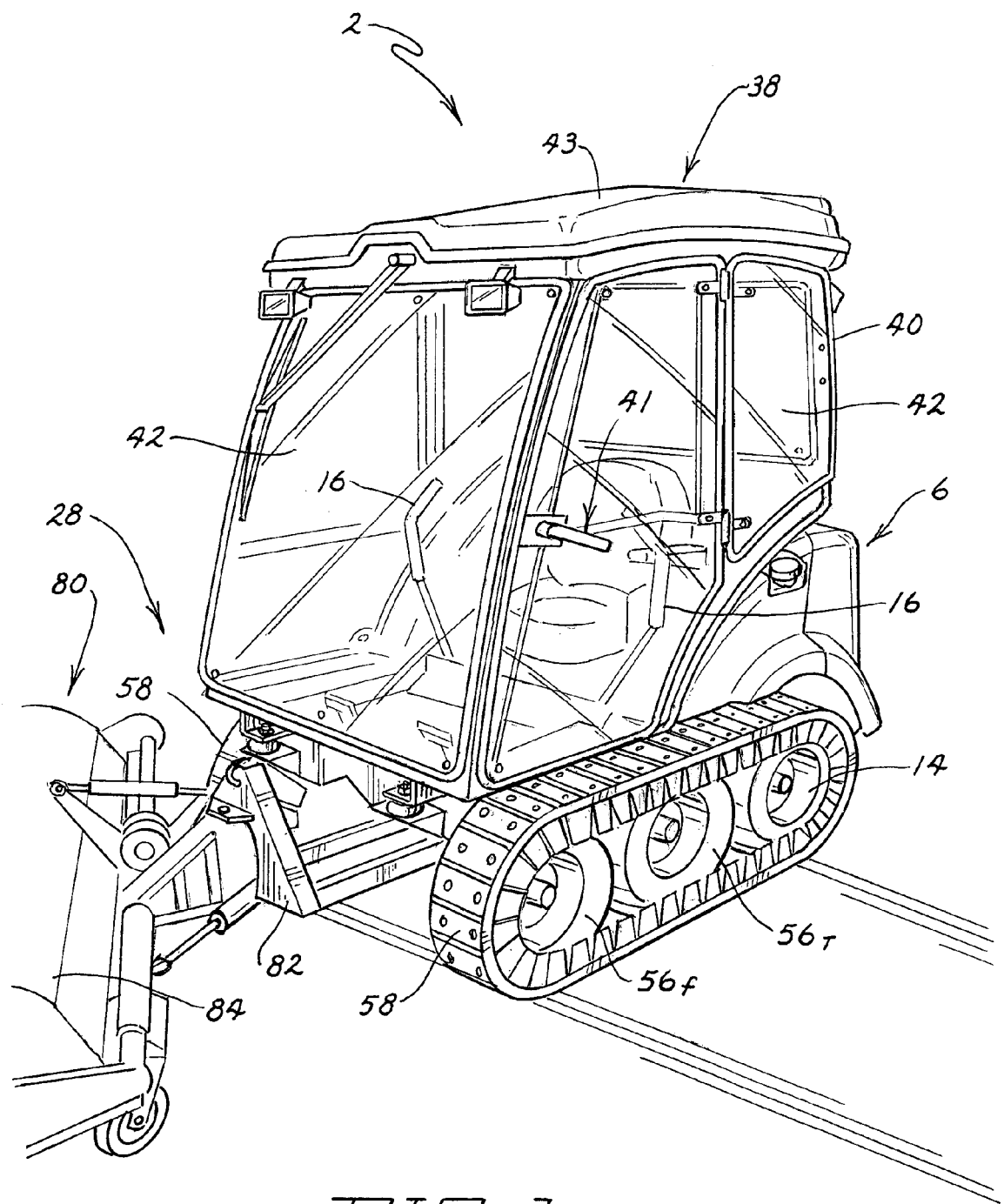
FIG. 1 is a perspective view of a tracked implement according to this invention, particularly illustrating a tracked unit having been releasably joined to a separate, freestanding drive unit to form a complete, operable tracked implement and illustrating a ground or turf grooming or working device on the front of the tracked implement.
Figure 2:
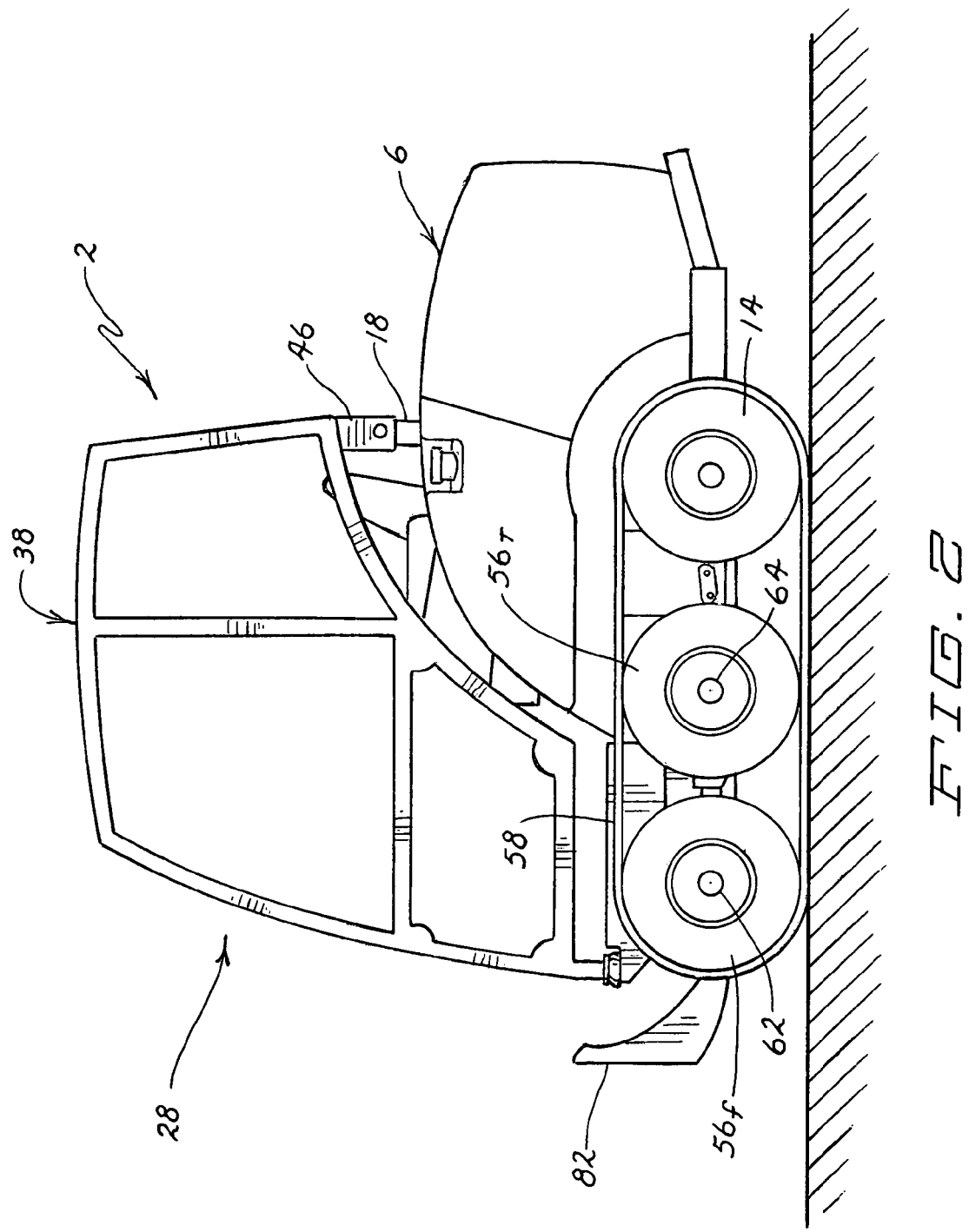
FIG. 2 is a side elevational view of the tracked implement of FIG. 1, but with the ground or turf grooming or working device not being shown on the front of the tracked implement.
Figure 5:
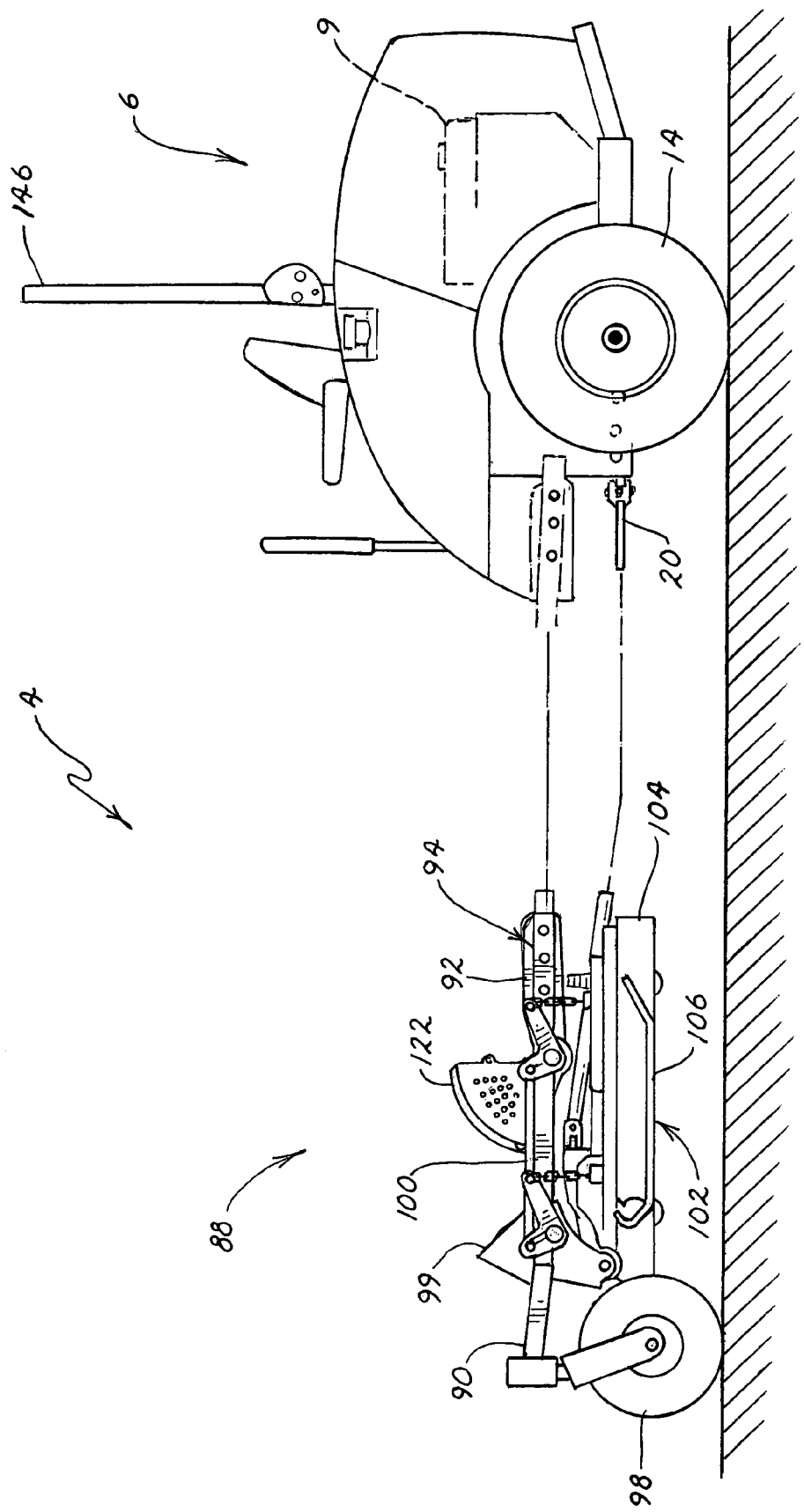
FIG. 5 is a side elevational view of a mower according to this invention, particularly illustrating the tracked unit having been removed from the drive unit and a mower unit in the process of being joined to the drive unit to convert the tracked implement of FIG. 1 to a mower.

FIG. 1 illustrates one embodiment of a tracked implement 2 according to this invention. Implement 2 preferably can be converted from a zero radius turn (ZRT) mower 4 as shown in FIG. 5 and vice versa. In other words, as will be explained in more detail hereafter, mower 4 can be changed into implement 2 and implement 2 can be changed back into mower 4. This conversion is one aspect of this invention.

However, implement 2 and mower 4 need not necessarily be convertible into the other. Both implement 2 and mower 4 could be provided as complete machines that would not undergo any conversion. Other aspects of this invention relate to how the endless tracks on implement 2 are supported. Yet other aspects of this invention relate to how a cutting deck is suspended from mower 4. These other aspects of this invention are not dependent upon being used only in a convertible implement 2 and mower 4.

The Drive Unit

Figure 3:
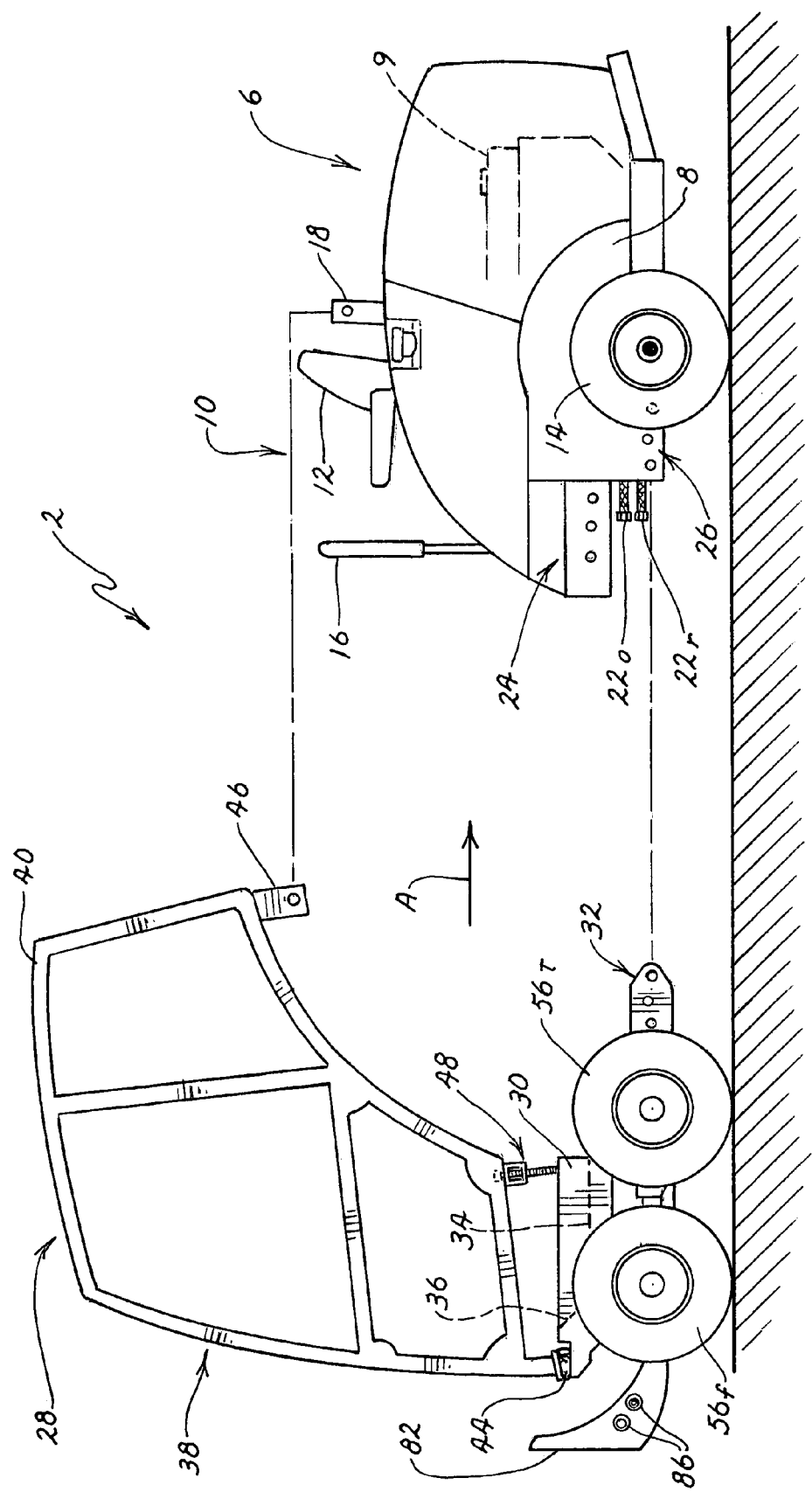
FIG. 3 is a side elevational view similar to FIG. 2, particularly illustrating the tracked implement in its separable parts comprising a tracked unit and a drive unit prior to the tracked unit being joined to the drive unit and prior to the installation of the endless ground engaging tracks, and further showing the cab on the tracked unit having been pivoted forwardly to allow the rear of the cab to clear the operator's seat when the tracked unit is being installed or removed from the drive unit.

There is a portion of both mower 4 and implement 2 that is common to each. The common portion is a ZRT drive unit 6. Drive unit 6 is shown in FIG. 3 as part of what will become implement 2. The identical drive unit 6 is shown in FIG. 5 as part of what will become mower 4.

Drive unit 6 includes a drive frame 8 which carries a prime mover 9, such as an internal combustion engine. Drive unit 6 also includes an operator's station 10 provided on drive frame 8. Preferably, operator's station 10 includes a seat 12 for supporting a seated operator. However, operator's station 10 could comprise a platform for supporting a standing operator.

A pair of drive wheels 14 with rubber tires is provided on drive frame 8 for self propelling drive unit 6 over the ground. There is a left drive wheel 14 and an identical right drive wheel (not shown). Preferably, drive wheels 14 operate in a ZRT fashion. Namely, each drive wheel 14 is driven in forward and reverse independently of one another to allow both propulsion and steering of drive frame 8 using differential control of drive wheels 14. For example, to execute a zero radius turn or spin turn, one drive wheel 14 will be driven forwardly while the other drive wheel 14 is reversed.

Any suitable control system can be provided on drive frame 8 for use by an operator to control the operation of drive wheels 14. With ZRT drive wheels, one embodiment of a control system that may be used is a pair of left and right control sticks 16 that independently control the operation of the left and right drive wheels. When each control stick 16 is pushed forwardly by the operator out of a neutral position, the corresponding drive wheel 14 is driven forwardly. When each control stick 16 is pulled rearwardly by the operator out of a neutral position, the corresponding drive wheel 14 is driven rearwardly.

Thus, to execute a zero radius turn or spin turn, one control stick 16 is pushed forwardly by the operator while the other control stick 16 is simultaneously pulled rearwardly by the operator. Both control sticks 16 are arranged adjacent seat 12 for convenient access by the operator. Instead of twin control sticks 16, the control system could comprise a rotatable steering wheel with a foot operated traction pedal for controlling the ground speed.

A traction system is provided on drive frame 8 for independently powering drive wheels 14 in the aforementioned manner. One common traction system comprises a pair of left and right hydraulic motors (not shown) whose drive shafts are coupled to the left and right drive wheels 14, respectively. One or more hydraulic pump (not shown) and hydraulic reservoir (not shown) are carried on drive frame 8 and the pump is driven by prime mover 9 to supply pressurized hydraulic fluid to the hydraulic motors. Thus, drive wheels 14 are driven by prime mover 9 through the hydraulic pump and the hydraulic motors. Non-hydraulic traction systems could be used in place of a hydraulic drive system to independently rotate drive wheels 14.

It is preferred that drive wheels 14 of drive unit 6 be capable of ZRT operation as described above. However, drive wheels 14 could be driven in a non ZRT mode. For example, drive wheels 14 could be mounted on the end of a conventional transaxle having a differential. In this case, drive wheels 14 rotate in forward and reverse simultaneously with the differential allowing drive wheels 14 to rotate at different speeds during a turn. Unlike the ZRT drive wheels in which one wheel can rotate forwardly while the other rotates rearwardly, a drive unit equipped with a transaxle/differential drive does not permit drive wheels 14 to rotate in different directions simultaneously. Thus, with this latter type of drive, the turning radius of drive unit 6 will be increased.

A pair of left and right mounting posts 18 are provided on drive frame 8 behind and below the top of operator's seat 12. Only the right mounting post 18 is shown in FIG. 3. The left mounting post is identical but is hidden in FIG. 3. As will be described in more detail hereafter, mounting posts 18 will serve as attachment points for different components when drive unit 6 is used as part of implement 2 or mower 4, as shown in FIGS. 3 and 5.

Drive unit 6 includes a forwardly extending power takeoff shaft (PTO) 20 for providing mechanical power from prime mover 9 to various components on implement 2 or mower 4. See FIG. 5. In addition, when drive unit 6 includes one or more hydraulic pumps and reservoir, drive unit 6 includes a pair of hydraulic output and return-hoses 22. See FIG. 3. Hydraulic hoses 22 serve to supply hydraulic power to implement 2 or mower 4. Pressurized fluid flows from the pump through output hose $22_o$ and returns to the reservoir through the return hose $22_r$. Obviously, hoses 22 will be connected to similar hoses provided on implement 2 or mower 4 when implement 2 or mower 4 also includes a hydraulically powered component. The connection between hoses 22 on drive unit 6 and the hoses on implement 2 or mower 4 will be made using conventional quick connectors.

Obviously, drive unit 6 as disclosed herein is not a complete, operative implement 2 or mower 4 by itself. For one thing, it is supported for movement only by a single pair of drive wheels 14 so that it would not be stably supported for movement over the ground even if the weight of drive unit 6 were balanced over drive wheels 14. Drive unit 6 will tilt one way or the other unless supported by jacks or jack stands. When operator's station 10 includes an operator's seat 12, there is no floorboard or footrests on drive unit 6 on which the operator's feet can rest. Instead, the operator's lower legs and feet would dangle in free space ahead of drive unit 6. Finally, there is no working device carried on drive unit 6 for providing any type of ground or turf grooming or working operation.

Thus, it is self-evident that something must be coupled to drive unit 6 to make it into implement 2 or mower 4. In the case of mower 4, a mower unit is coupled to drive unit 6 using a first set of mounting holes 24 provided on each side of drive frame 8. In the case of implement 2, a tracked unit 28 is coupled to drive unit 6 using a second lower and rearward set of mounting holes 26 provided on drive frame 8. While it is easier to use different sets of mounting holes 24 or 26 to attach either the mower unit or tracked unit 28 to drive unit 6 given their different geometries, it would be possible to design the mower unit and tracked unit 28 to use the same set of mounting holes on drive frame 8. In this case, only a single set of mounting holes would be provided on either side of drive frame 8.

The description of this invention will continue with separate descriptions of tracked unit 28 and the mower unit.

The Tracked Unit

Tracked unit 28 comprises a track frame 30 having a set of attachment holes 32 on either side of track frame 30 that match the lower rearward set 26 of the mounting holes on drive frame 8. Track frame 30 can be rolled back towards drive frame 8 as indicated by the arrow A in FIG. 3. When the two approach each other, attachment holes 32 on each side of track frame 30 can be aligned with mounting holes 26. A plurality of bolts can then be installed through the aligned attachment and mounting holes to rigidly join track frame 30 of tracked unit 28 to drive frame 8 of drive unit 6.

Track frame 30 includes a floorboard 34 and footrests 36 for supporting the feet of the operator when tracked unit 28 is coupled to drive unit 6. When the two are secured together, floorboard 34 and footrests 36 will be immediately in front of and below seat 12 in operator's station 10. Thus, as the operator sits on seat 12, the operator's lower legs and feet will be comfortably supported on floorboard 34 and/or footrests 36 provided on tracked unit 28. This is one way that tracked unit 28 completes or finishes drive unit 6 to form a complete, operative implement.

Track frame 30 of tracked unit 28 carries a cab 38 for enclosing operator's station 10 when tracked unit 28 is married with drive unit 6. Cab 38 has a framework 40 that supports a plurality of glass panels 42 to allow the operator good visibility out of cab 38. The shape of cab 38 and the number and placement of glass panels 42 can obviously vary. Cab 38 is topped by a roof 43 and includes a door 41 that can be opened and closed.

The overall purpose of cab 38 is to substantially completely surround the operator and protect the operator from the elements as the operator is supported at operator's station 10. Cab 38 is particularly important on tracked unit 28 since many of the ground or turf grooming or working devices used in conjunction with tracked unit 28 will be used during the winter when the weather is cold.

Figure 4:
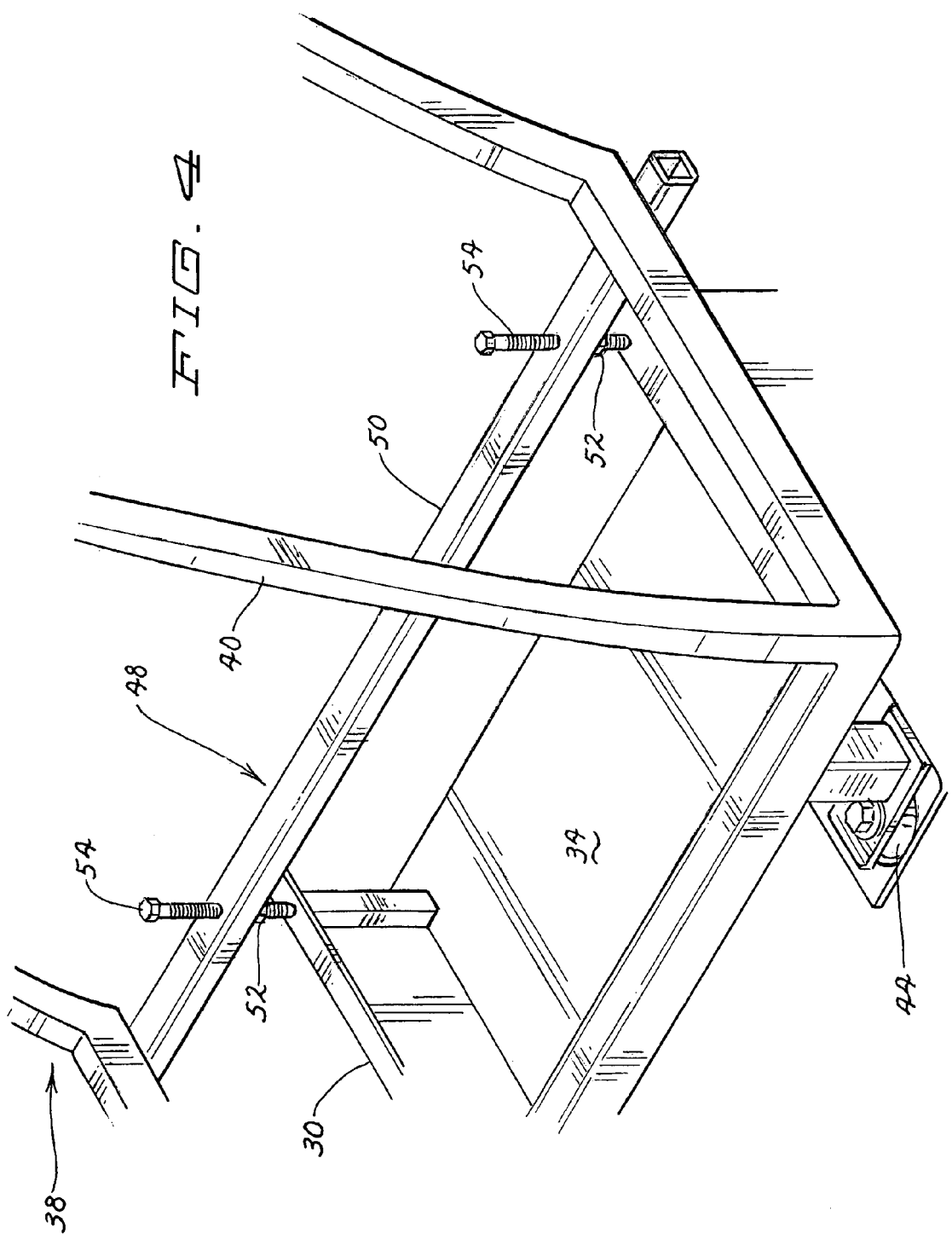
FIG. 4 is an enlarged perspective view of a portion of the cab of the tracked implement of FIG. 1, particularly illustrating a manually operable jack for pivoting the cab on the tracked unit relative to the tracked unit.

The front of cab 38 is pivotally mounted to track frame 30 by a pair of compressible rubber mounts 44. One such rubber mount 44 is shown in FIG. 4. If the rear of cab 38 is pushed upwardly, cab 38 will pivot or rock forwardly on rubber mounts 44. This forward rocking of cab 38 is illustrated in FIG. 3. Rubber mounts 44 will compress as need be to allow this pivoting or rocking motion of cab 38.

In fact, cab 38 will need to be rocked forwardly on rubber mounts 44 during the process of coupling or uncoupling tracked unit 28 from drive unit 6. The rear of cab 38 has a pair of left and right mounts 46 that bolt to mounting posts 18 that are located on drive frame 8 behind and below seat 12. Securing cab 38 to drive frame 8 behind and below seat 12 is preferred so that the rear of cab 38 snugs up to drive frame 8 without leaving any large openings behind seat 12. Accordingly, it is necessary to rock cab 38 forwardly to allow mounts 46 on cab 38 to clear seat 12 when tracked unit 28 is being rolled towards or away from drive unit 6. When tracked unit 28 is being joined to drive unit 6, the forward rocking of cab 38 can be discontinued after mounts 46 pass over seat 12 and cab 38 will settle back down into a non-rocked, normal operational posture with mounts 46 on the rear of cab 38 mating with posts 18 on drive frame 8.

FIG. 4 discloses a simple jack 48 that can be selectively used to rock cab 38 forwardly about rubber mounts 44. Jack 48 is an elongated bar 50 that is long enough to span the width of cab 38. Bar 50 also engages towards the rear of cab 38 against the underside of some of the longitudinal frame members of cab framework 40. Bar 50 includes a threaded nut 52 fixed to the bottom of each side of bar 50. A pair of threaded bolts 54 extend downwardly through bar 50 and are threaded into and through nuts 50. The top hex head of each adjusting bolt 54 is located above bar 50 and the lower end of bolt 54 is below bar 50.

When jack 48 is positioned as shown in FIG. 4, the operator can rock cab 38 forwardly about its rubber mounts 44 by raising bar 50 upwardly using threaded adjusting bolts 54. When the lower ends of bolts 54 are engaged against track frame 30 of tracked unit 28 as shown in FIG. 4, rotating bolts 54 in the correct direction will cause bar 50 to rise upwardly due to threaded nuts 52 carried on bar 50. If bar 50 is raised far enough as shown in FIG. 3, cab 38 will then be sufficiently rocked forwardly on rubber mounts 44 to allow mounts 46 on cab 38 to clear seat 12.

Jack 48 can be left in place in tracked unit 28 in this raised position whenever tracked unit 28 is not joined to drive unit 6. For example, if tracked unit 28 has been removed from drive unit 6 for storage during the offseason, jack 48 will normally simply be left in place. However, jack 48 can be easily removed if desired and would be removed when tracked unit 28 is joined to drive unit 6. Jack 48 can be removed by lowering bar 50 on bolts 54 until bar 50 disengages framework 40 of cab 38 after cab 38 has leveled out. Jack 48 can then be lifted out of cab 38 by opening door 41 of cab 38 and lifting jack 48 out through the open door 41 of cab 38.

Each side of track frame 30 includes a pair of idlers 56 that will subsequently partially support an endless ground engaging belt or track 58. Idlers 56 preferably comprise a pair of support wheels with rubber tires. This allows tracked unit 28 to roll over the ground when the endless tracks 58 are not yet installed. This is the situation prior to tracked unit 28 being joined to drive unit 6 as shown in FIG. 3. The support wheels comprising idlers 56 clearly permit rolling movement of tracked unit 28 towards and away from drive unit 6.

Each pair of idlers 56 on each side of track frame 30 comprises a front idler 56$_f$ and a trailing idler 56$_t$ located behind front idler 56$_f$. These two idlers are supported on track frame 30 in a novel manner providing various advantages.

First, front idler 56$_f$ and trailing idler 56$_t$ on each side of track frame 30 are both rotatably journalled on a common idler support 60 about axes of rotation that are fixed relative to idler support 60. Front idler 56$_f$ rotates on the front of idler support 60 about a front idler axis 62. Trailing idler 56$_t$ rotates on the rear of idler support 60 about a trailing idler axis 64. Idler support 60 is itself pivotal relative to track frame 30 about an idler support pivot axis 66. Idler support pivot axis 66 is located between front idler axis 62 and trailing idler axis 64.

In fact, the location of idler support pivot axis 66 is carefully chosen to prevent track elongation when tracked unit 28 climbs an obstruction, such as a curb or the like. The Applicants have found that placing idler support pivot axis 66 to the rear of the midpoint between front idler axis 62 and trailing idler axis 64, i.e. closer to trailing idler axis 64 than to front idler axis 62, is desirable. When the rearward location of idler support pivot axis 66 is properly chosen, the overall geometry is effective to keep the overall track length substantially constant when implement 2 climbs up over an obstruction through an angle of inclination of at least approximately 15° or less.

The exact rearward location of idler support pivot axis 66 can be found through trial and error or by calculation. One simply incrementally moves the location of idler support pivot axis 66 and then measures or calculates the amount of track elongation at various angles of inclination. The location that provides the least track elongation, and preferably substantially no track elongation, through the desirable range of angles, from 0° through approximately 15°, is then chosen.

Figure 7:
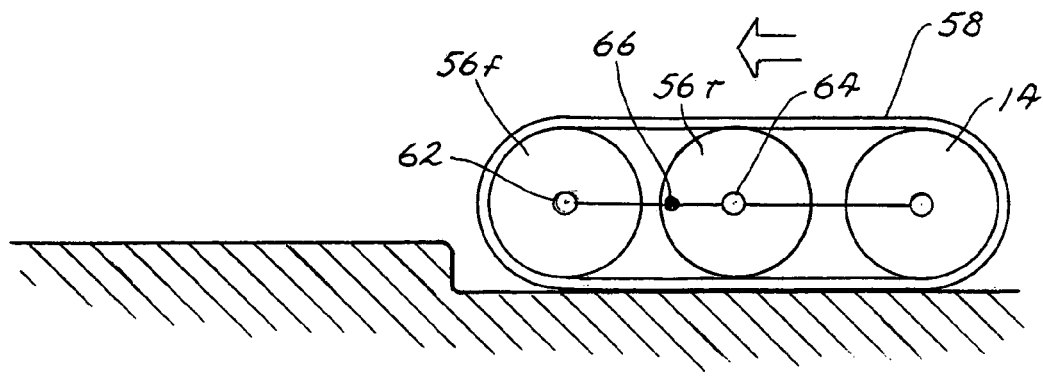
FIGS. 7-9 are diagrammatic side elevational views of the ground propelling operation of the tracks of the tracked implement of FIG. 1, particularly illustrating the pivoting motion permitted for the front and trailing idlers when the track climbs an obstruction such as a curb.
Figure 8:
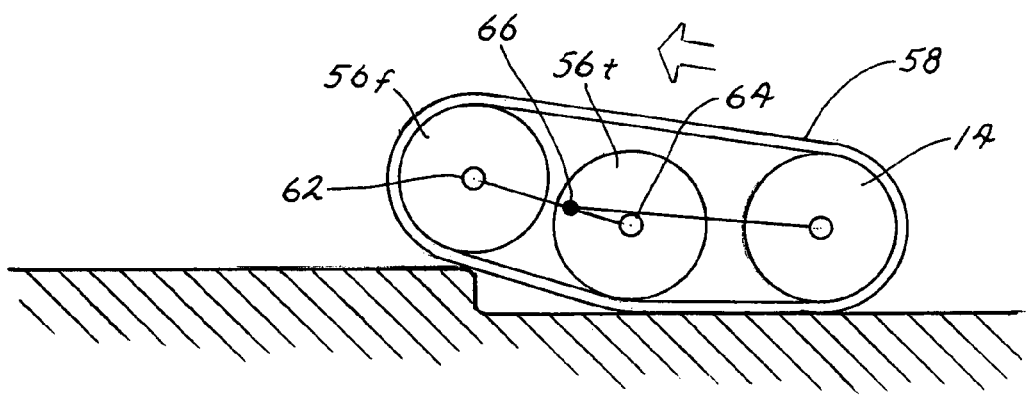
Figure 9:
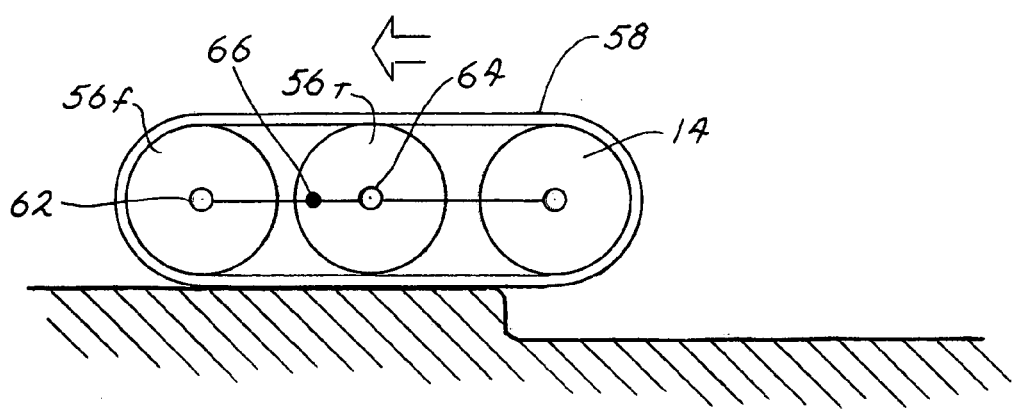

FIGS. 7-9 illustrate what happens when implement 2 climbs up over an obstruction that produces an angle of inclination of track 58 within the selected range. As front idler 56$_f$ reaches the obstruction and rises up onto the obstruction, trailing idler 56$_t$ will remain on level ground. Idler support 60 that couples front idler 56$_f$ and trailing idler 56$_t$ will pivot on track frame 30 to accommodate this situation with front idler 56$_f$ rising upwardly and trailing idler 56$_t$ falling downwardly relative to their previous positions. Compare FIG. 8 to FIG. 7 to see the relative positions of idlers 56 produced by the pivotal motion of idler support 60. Of course, as shown in FIG. 9, once tracked unit 28 has climbed up the obstruction and reaches level ground, the positions of the front and trailing idlers revert to their usual normal operational positions in which front idler axis 62, idler support pivot axis 66, and trailing idler axis 64 are all in line and are substantially horizontal.

As described previously, when the location of idler support pivot axis 66 is properly chosen, there will be no substantial amount of track elongation when climbing obstructions within the selected range of inclination. This means that the front and trailing idlers 56 can be mounted to idler support 60 on fixed pivot axes and do not need to slide towards and away from one another as would be typical for tracked vehicles. Thus, the relatively rigid and pivotal suspension system for idlers 56 is extremely simple, durable and cost effective and avoids the need for a spring biased suspension on idlers 56. Yet, implement 2 can still climb obstructions without elongating track 58 to provide adequate track tension.

Figure 10:
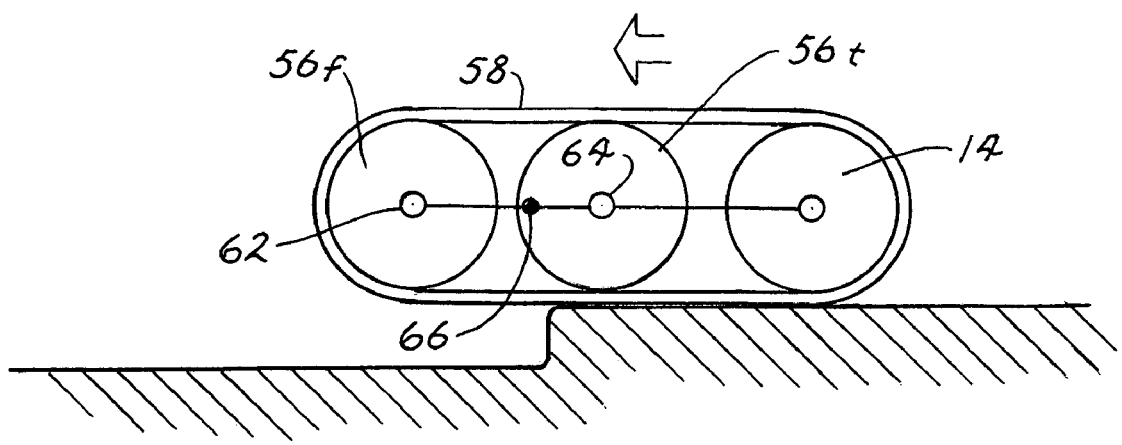
FIGS. 10-11 are diagrammatic side elevational views similar to FIGS. 7-9, particularly illustrating that no pivoting motion is permitted for the front and trailing idlers when the track drives off an obstruction such as a curb.
Figure 11:
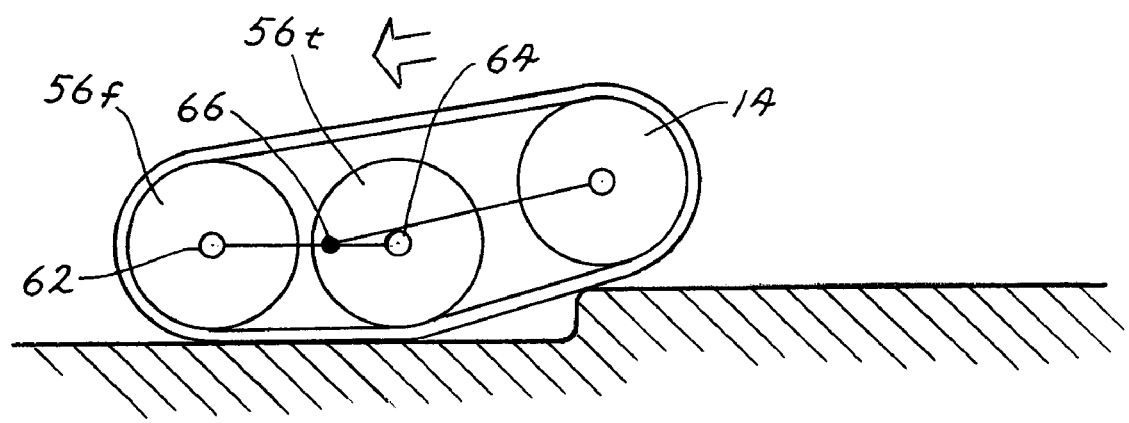

Referring now to FIGS. 10 and 11, when implement 2 drives off a similar obstruction, pivoting of idler support 60 in the opposite direction is prevented or stopped. Thus, referring to FIG. 10, as front idler 56$_f$ passes off the obstruction and with trailing idler 56$_t$ still on the obstruction, allowing front idler 56$_f$ to pivot down would cause unacceptable track elongation. Thus, this movement of front idler 56$_f$ is positively prevented. After both the front and trailing idlers 56 have dropped off the obstruction, idler support 60 can still pivot in the manner noted above to accommodate the position of the rear track support in the form of drive wheel 14 when drive wheel 14 is still on top of the obstruction. See FIG. 11.

Figure 14:
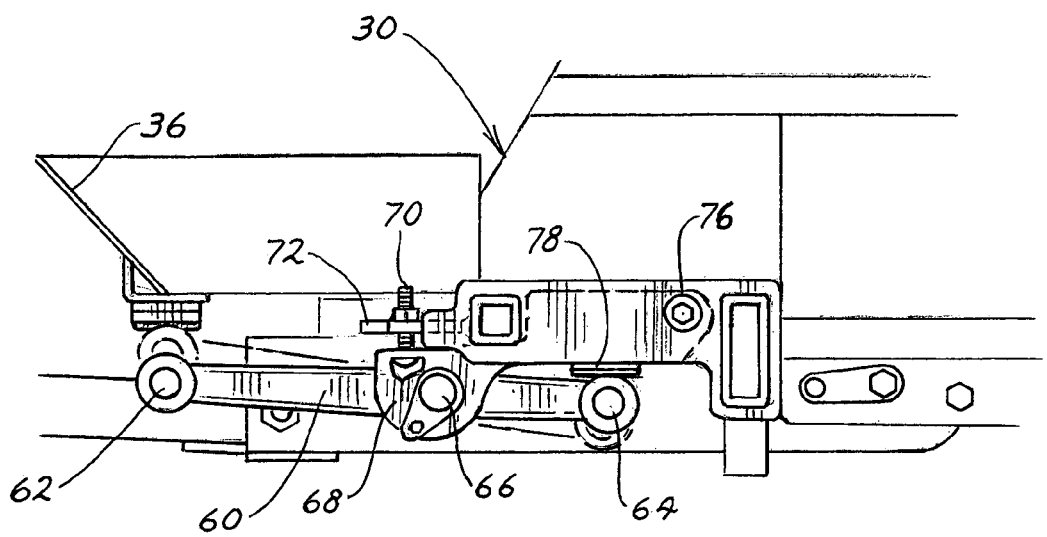
FIG. 14 is a side elevational view of a portion of the tracked implement of FIG. 1, particularly illustrating one of the idler supports as well as the pivotal hanger that connects the idler support to the track frame of the tracked unit, the pivotal hanger being shown secured to the track frame in its normal operational position.
Figure 15:
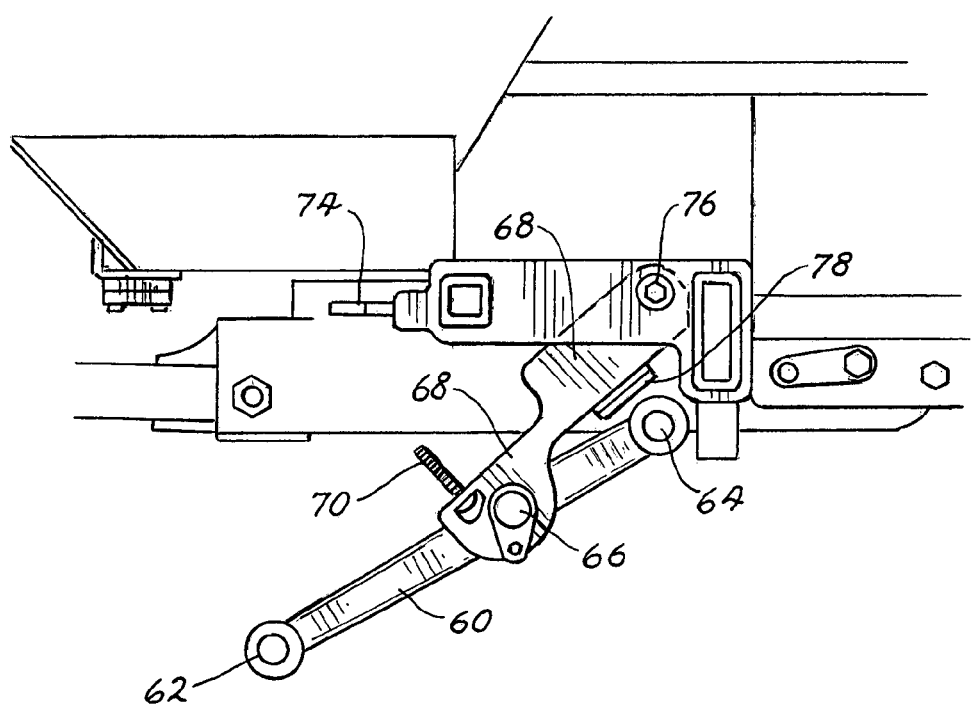
FIG. 15 is a side elevational view similar to FIG. 14, particularly illustrating the pivotal hanger for the idler support having been released from the track frame to permit the hanger and the idler support to swing down relative to the tracked unit to the tension releasing position that is diagrammatically illustrated in FIG. 13 for track removal and installation.

Idler support 60 on each side of track frame 30 is itself carried on one end of a pivotal arm or hanger 68. Idler support pivot axis 66 is carried on hanger 68 so that hanger 68 connects to idler support 60 between front idler axis 62 and trailing idler axis 64 as shown in FIGS. 14 and 15. During normal operation of implement 2, hanger 68 is fixed to track frame 30 by an attachment bolt 70 carried on hanger 68. Bolt 70 may be secured by a nut 72 to a flange 74 on track frame 30. The fixed location of hanger 68 is shown in FIG. 14 with the usual pivotal motion of idler support 60 that was previously discussed in conjunction with FIGS. 7-9 being shown in phantom lines in FIG. 14.

Hanger 68 is pivoted to track frame 30 at its other end, namely at the end of hanger 68 that does not hold idler support 60. Thus, hanger 68 is pivotal relative to track frame 30 about a hanger pivot axis 76 shown in FIGS. 14 and 15. If track frame 30 is jacked up above the ground and if nut 72 is removed from bolt 70, hanger 68 will be released from track frame 30 to pivot downwardly. Hanger 68 is shown in its downwardly pivoted position in FIG. 15. Hanger 68 is selectively put into this position in order to install or remove track 58 from front idler 56$_f$, trailing idler 56$_t$ and drive wheel 14.

Figure 12:
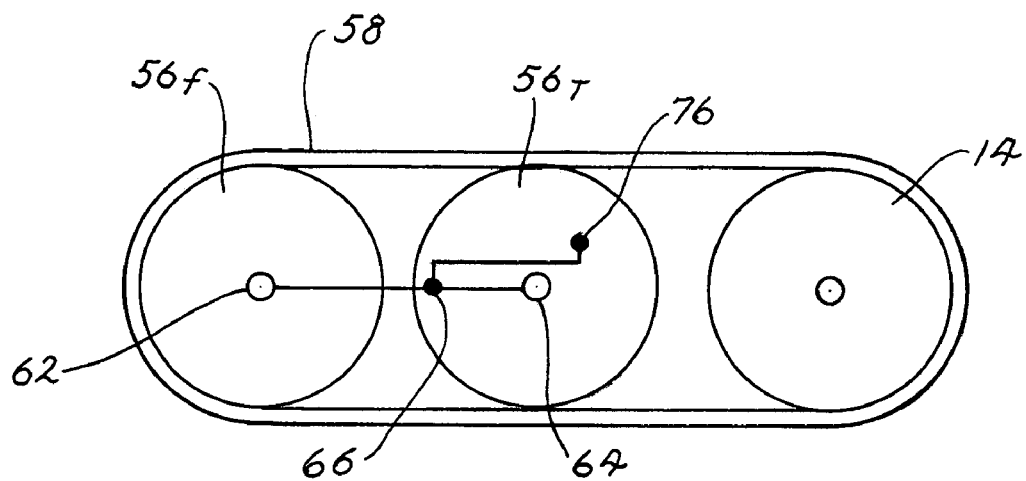
FIGS. 12-13 are diagrammatic side elevational views of the track removal operation for the tracked implement of FIG. 1, particularly illustrating how the front and trailing idlers can be released from the tracked unit to swing downwardly to release tension on the track.
Figure 13:
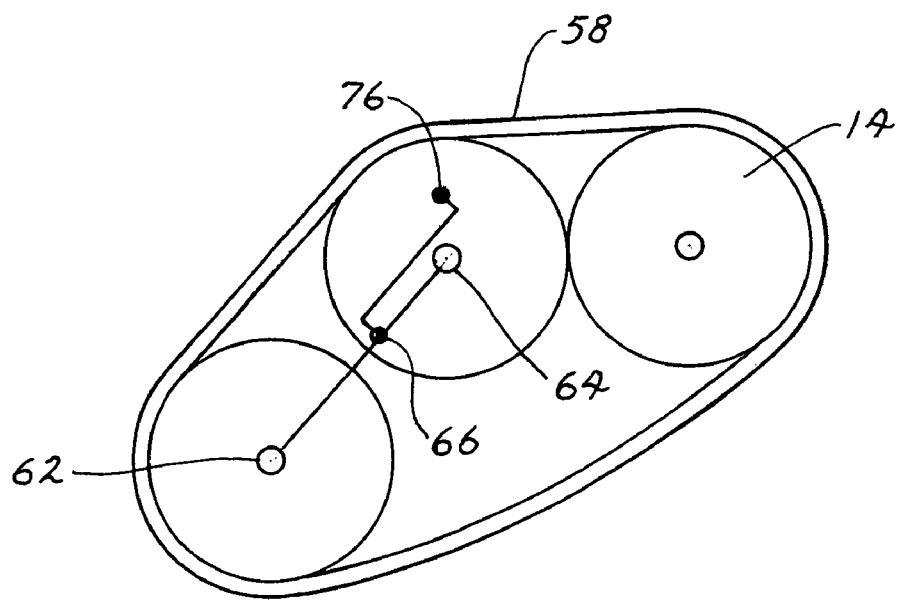

FIGS. 12 and 13 help illustrate what happens when hanger 68 is disconnected from track frame 30. FIG. 12 shows the situation when hanger 68 is still rigidly attached to track frame 30 by bolt 70. In this position, corresponding to normal operations of implement 2, front idler 56$_f$, trailing idler 56$_t$ and drive wheel 14 are all in line with track 58 being entrained around them and being properly tensioned. However, if bolt 70 is disconnected from track frame 30, then hanger 68 pivots downwardly to the position shown in FIG. 13. In this position, trailing idler 56$_t$ has swung back to abut against drive wheel 14 and front idler 56$_f$ has pivoted downwardly by a fair amount. There is now considerable slack in track 58.

To remove track 58 with the parts as shown in FIG. 13, one could simply slide track 58 off to one side of front idler 56$_f$, trailing idler 56$_t$, and drive wheel 14. However, if this cannot easily be done by the operator, then trailing idler 56$_t$ and/or drive wheel 14 could also be removed from idler support 60 leaving track 58 entrained around only front idler 56$_f$ or around front idler 56$_f$ and drive wheel 14. The jack holding track frame 30 upwardly can then be lowered enough to allow hanger 68 to be resecured to track frame 30. Traction frame 30 can then be jacked back up to allow track 58 to be easily slid off to one side of front idler 56$_f$ or front idler 56$_f$ and drive wheel 14. This process is repeated on both sides of track frame 30.

With both tracks 58 removed, each trailing idler 56$_t$ can be remounted to each idler support 60 if it was removed during the track removal process. In addition, drive wheels 14 used for mower 4 are installed back on drive unit 6. If the jack holding track frame 30 off the ground during this track removal process is now released and removed, track frame 30 will settle back down onto the ground, now supported by front idler 56$_f$ and trailing idler 56$_t$, both of which are rubber tired wheels.

With track frame 30 unbolted from drive frame 8 of drive unit 6, tracked unit 28 can now simply be rolled away from drive unit 6 for storage. This assumes, of course, that cab 38 has also been disconnected from drive frame 8 and has been rocked forwardly to allow cab 38 to clear seat 12. This also assumes that any connections between PTO 20 and the hydraulic hoses 22 on drive frame 8 and any mechanically or hydraulically powered equipment on track frame 30 have been released at some point in this process. Electrical and heater hoses (not shown) for cab 38 will also need to be disconnected. Nonetheless, it is quite simple and fairly easy to install and remove tracked unit 28 from drive unit 6 when forming or disassembling tracked implement 2 of this invention. This can also be done relatively quickly.

The stop 78 that limits or prevents pivotal motion of idler support 60 in one direction can be seen in FIGS. 14 and 15 on the underside of hanger 68. This stop 78 abuts against the top of idler support 60 rearwardly of idler support pivot axis 66 to prevent what would be counter-clockwise rotation of idler support 60 in FIG. 14. Only clockwise rotation of idler support 60 is permitted. This permitted rotation is that in which the rear of idler support 60 pivots or moves downwardly away from stop 78.

Preferably, stop 78 is adjustable downwardly from the position shown in FIGS. 14 and 15 if desired to adjust how track 58 lies against the ground in the normal, operational position of track 58. If conditions are icy and snowy and one wishes maximum traction, then the orientation shown in FIGS. 14 and 15 would be used. In this orientation as diagrammatically shown in FIG. 12, track 58 lies flat against the ground over its entire length.

However, with this substantially flat track orientation, tracks 58 will scrub when turning. If conditions are relatively dry such as when there is no snow or ice on the ground, or when operating on a dry smooth surface such as a paved road, it might be desirable to move stops 78 on each idler support 60 downwardly to force trailing idler 56$_t$ downwardly relative to front idler 56$_f$ and drive wheel 14. Stops 78 can be adjusted downwardly by shimming them downwardly or by using some other adjustment mechanism such as a threaded adjustment rod. This will create more of a point contact between track 58 and the ground as track 58 now forms a slight V-shape relative to the ground about trailing idler 56$_t$. This reduces the scrubbing effect when turning. Obviously, this adjustment of stop 78 is done selectively to account for surface conditions and will be left unchanged until the operator wishes to make a change.

Finally, implement 2 will carry some kind of a device 80 on the front thereof for performing some type of ground or turf grooming or working operation other than grass cutting. The front of track frame 30 includes an A-frame quick attachment 82 for holding a variety of devices 80. For example, a portion of a housing of a rotary brush 84 is shown in FIG. 1 which brush rotates around a transverse, horizontal axis for brushing snow off a sidewalk or road. A powered two stage snowthrower could comprise device 80. Other powered or even non-powered devices 80, such as a snowplow blade, could be carried on quick attachment 82. Thus, device 80 attached to implement 2 could have a variety of forms.

Typically, A-frame quick attachment 82 will have a hydraulic lift and lower system represented by hydraulic connections 86 for allowing attachment 82 to be raised or lowered to raise and lower device 80 connected to quick attachment 82. This lift and lower system is what will be connected to the hydraulic output and return hoses 22 on drive unit 6. This provides the operator with selective control of the vertical position of device 80 from seat 12 on drive unit 6. In addition, tracked unit 2 will typically include another hydraulic system for providing left and right pivoting of device 80 or some portion of device 80 relative to a fore-and-aft axis, such as adjusting the angle of a straight plow blade, or the angle of a snow discharge chute on a two stage snowthrower, or the angle of a rotary brush 84.

In addition, many devices 80, such as the aforementioned rotary brush 84 or two stage snowthrower, will be mechanically powered. When a mechanically powered device 80 is used on quick attachment 82, such a device 80 will be driven using PTO 20 on drive unit 6. Obviously, if device 80 is powered in some other way or is unpowered, such as a static snowplow blade, then PTO 20 on drive unit 6 would not be utilized by tracked unit 28.

The Mower Unit

Figure 6:
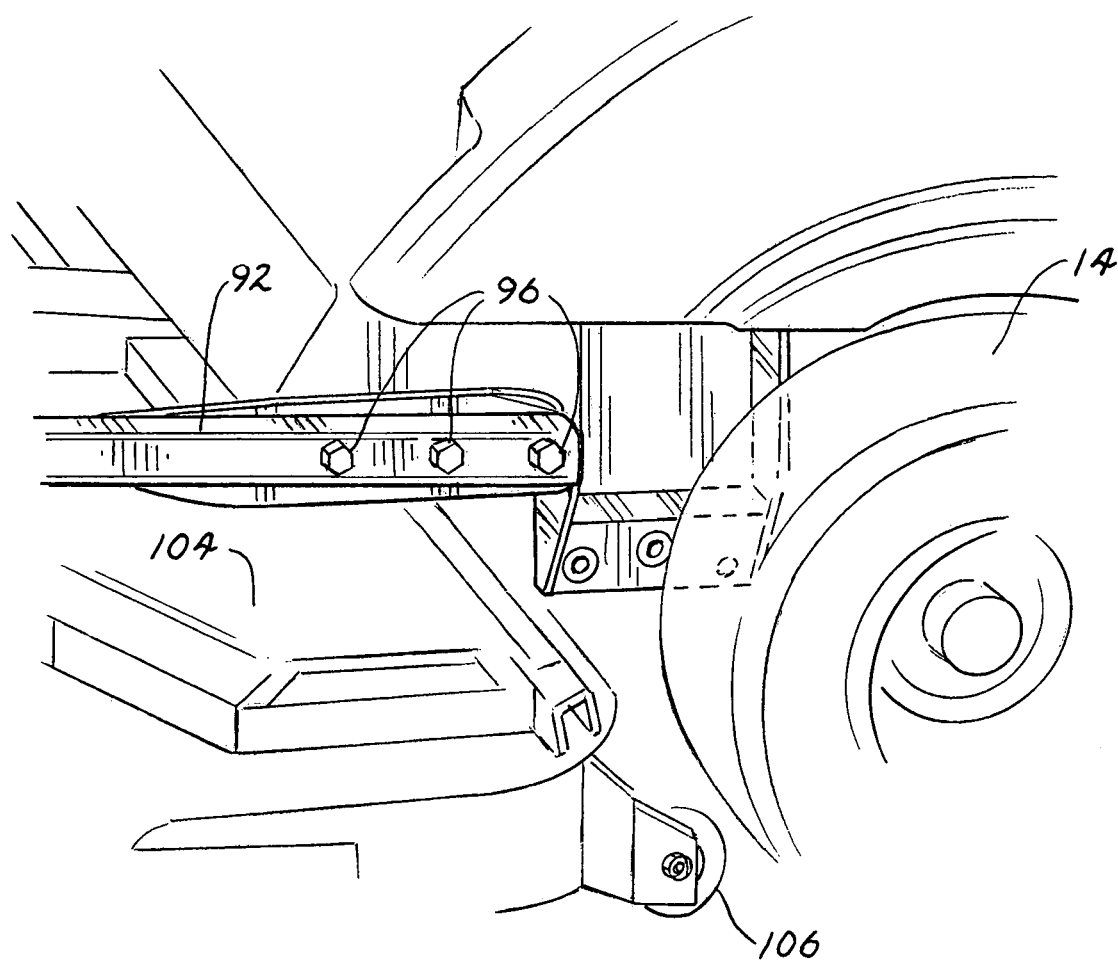
FIG. 6 is an enlarged perspective of a portion of the mower of FIG. 5, particularly illustrating the mower unit having been bolted to the drive unit to form a complete mower.

FIGS. 5 and 6 show a mower unit 88 that can be used with drive unit 6 in place of tracked unit 28 to convert tracked unit 28 into mower 4. Mower unit 88 as shown in FIGS. 5 and 6 comprises a generally U-shaped mower frame 90 having a pair of rearwardly extending arms 92 each having a set of attachment holes 94 therein. Attachment holes 94 match the pattern of the mounting holes provided in the upper set 24 of mounting holes on each side of drive unit 6. Thus, mower frame 90 may be bolted to drive frame 8 after attachment holes 94 and mounting holes 24 are aligned with one another and a plurality of bolts 96 are inserted through the aligned holes. This attachment between mower frame 90 and drive frame 8 is shown in FIG. 6 along one side of mower frame 90 and drive frame 8.

Mower frame 90 is supported by a pair of front support wheels 98 attached adjacent the front corners of mower frame 90. Support wheels 98 are non-driven caster wheels. Like track frame 30, mower frame 90 provides a floorboard 99 and footrests 100 for the operator's feet when mower unit 88 is joined to drive unit 6. Drive unit 6 still has a pair of drive wheels 14 thereon which along with support wheels 98 on mower frame 90 support mower 4 for rolling over the ground. However, when drive unit 6 is mated with mower unit 88 to form a complete, operative mower 4, drive wheels 14 have a larger diameter than the drive wheels 14 that are used on drive unit 6 when drive unit 6 is mated with tracked unit 28.

Mower frame 90 carries a generally conventional cutting unit 102. Cutting unit 102 preferably comprises a rotary cutting deck 104 that forms a downwardly facing cutting chamber or chambers in which one or more rotary cutting blades (not shown) are carried. The cutting blades rotate about generally vertical axes in horizontal cutting planes. The peripheral skirt of the cutting deck is provided with various anti-scalp ground engaging wheels, rollers and/or skids 106. Other cutting units 102 besides rotary cutting decks 104 could be employed on mower frame 90.

Cutting deck 104 is suspended from mower frame 90 by a plurality of suspension chains 108 that extend between cutting deck 104 and the lower ends of a plurality of L-shaped height of cut adjustment links 110. Four chains 108 and four links 110 are provided spaced apart in a rectangular pattern. Each link 110 is pivotally carried on mower frame 90 by virtue of being mounted on a pivot axis 112. The height of cut provided by cutting deck 104 can be varied by simultaneously pivoting all four links 110 to raise or lower the upper suspension points of the fixed length chains 108, thus raising or lowering cutting deck 104 relative to the ground. The use of chains 108 connected between a cutting deck 104 and a plurality of pivotal links 110 is a well known height of cut adjustment system in the mower art.

Figure 17:
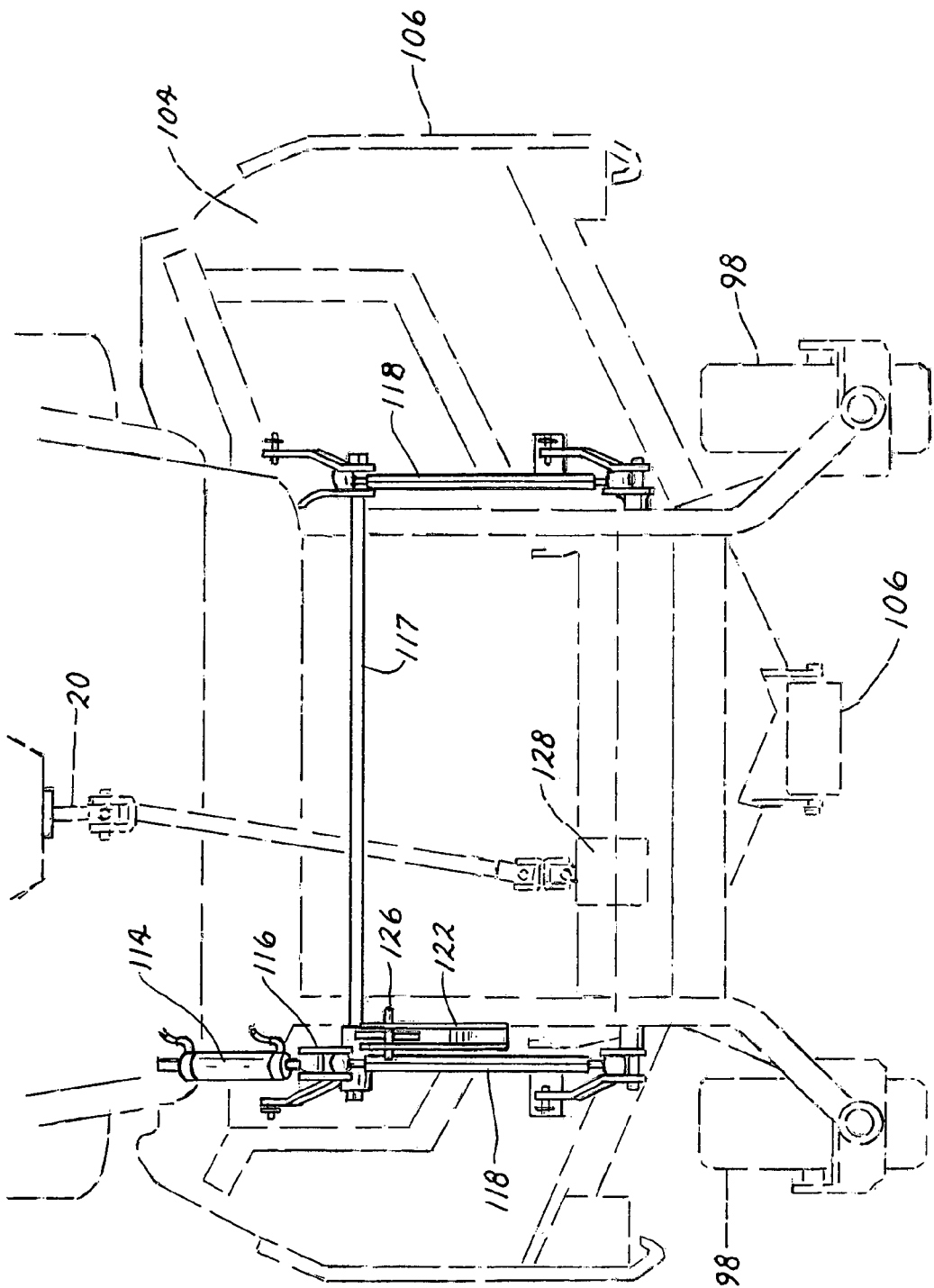
FIG. 17 is a top plan view of the mower unit of FIG. 16, particularly illustrating the height of cut adjustment system and a hydraulic cylinder for lifting and lowering the cutting deck.

Referring to FIG. 17, the links 110 are all connected together so that pivoting one link 110 will pivot the rest of links 110. A hydraulic cylinder 114 is connected by a bracket 116 to pivot the right rear link 110 (shown in the upper left in FIG. 17). The right rear link 110 is connected to the left rear link 110 by a cross-shaft 117. Each of the rear links 110 are secured by connecting rods 118 to the front links 110. Thus, rotation of the right rear link 110 will rotate all of the other links 110 in the same direction of rotation about their pivot axes 112. Links 110 could be rotated without using hydraulic cylinder 110 using a hand lever, a foot pedal, both a hand lever and foot pedal, etc.

Figure 16:
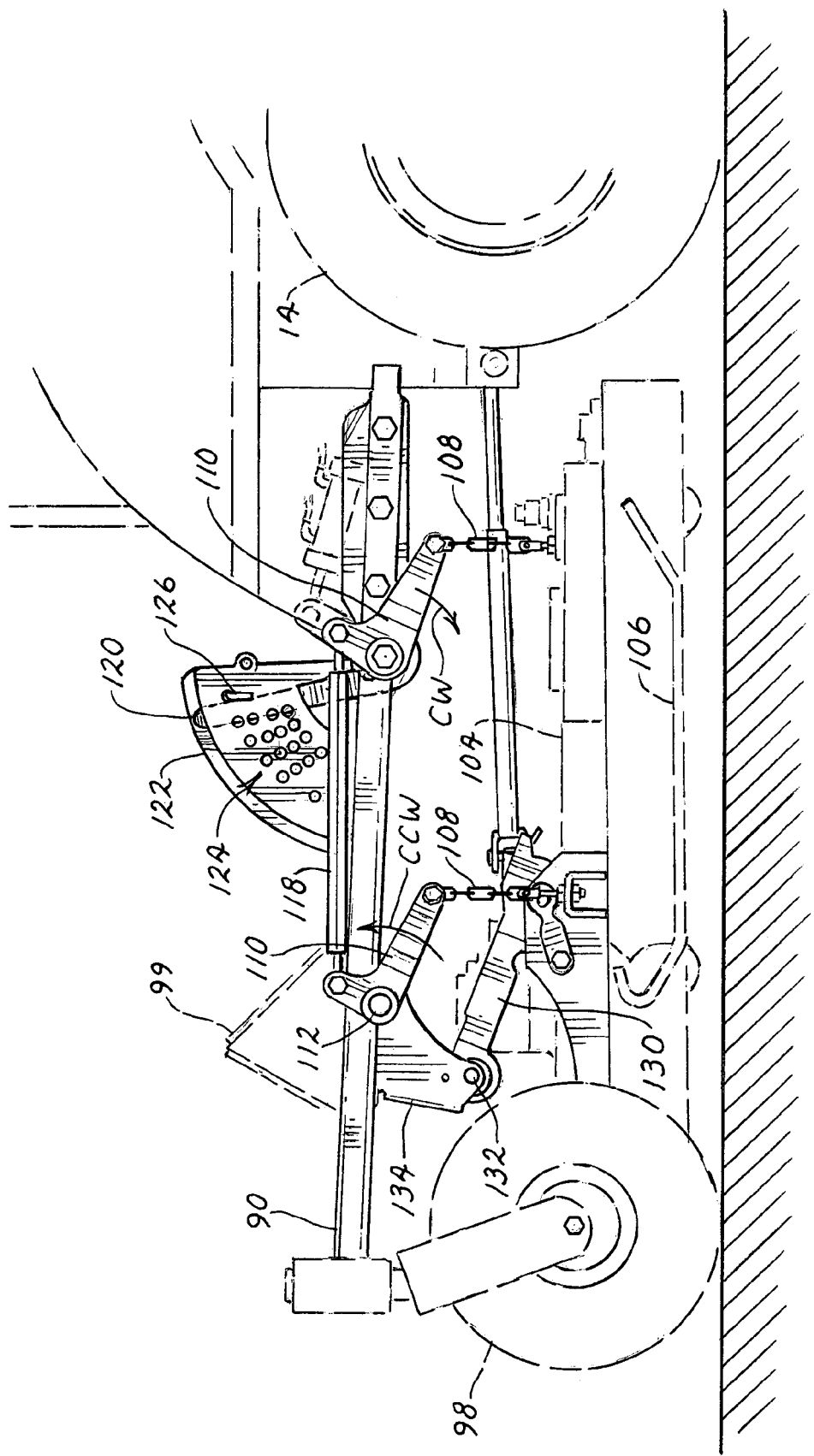
FIG. 16 is a side elevational view of a mower unit according to this invention, particularly illustrating the height of cut adjustment system for the cutting deck of the mower unit.

Referring to FIG. 16, cylinder 114 is also operatively connected to a height adjustment stop 120 for rotating stop 120 as cylinder 114 is extended and retracted. Stop 120 is placed adjacent to an arcuate locking plate 122 having an arcuate array of height adjustment holes 124. A limit pin 126 is inserted through a selected hole in the array of height adjustment holes 124 so as to be in position to abut against the rear of stop 120 at some point in the rotational motion of stop 120. The location of limit pin 126 establishes the height of cut.

Referring to FIG. 16, if cylinder 114 is extended, this will pivot all the links 110 in a counter-clockwise direction indicated by the arrow CCW in FIG. 16. This moves stop 120 away from limit pin 126. Thus, cylinder 114 can extend to its full stroke to lift cutting deck 104 to a maximum upper transport position. In this transport position, cutting deck 104 is spaced well above the ground and mower 4 can be transported at a higher speed than the speed normally used to cut grass.

Cylinder 114 is allowed to retract simply by permitting hydraulic fluid to flow back to the reservoir through hydraulic return hose $22_r$ by opening a valve (not shown) in the hydraulic circuit to cylinder 114. The weight of cutting deck 104 then forces cylinder 114 to retract.

When cylinder 114 retracts, links 110 will rotate in a clockwise direction indicated by the arrow CW in FIG. 16. This moves stop 120 back towards limit pin 126 and simultaneously begins to lower cutting deck 104 downwardly from its transport position. When stop 120 engages against limit pin 126, further retraction of cylinder 114 is prevented and the downward lowering movement of cutting deck 104 stops. The location of limit pin 126 within the arcuate array of holes 124 determines when this occurs to set the cutting height. The cutting height is lower the further limit pin 126 is set to the rear of the arcuate array of adjustment holes 124.

In this height adjustment system, cylinder 114 forms both lifts cutting deck 104 into an elevated position and holds cutting deck 104 in that position until the hydraulic fluid in cylinder 114 is permitted to return to the reservoir. Cylinder 114 also functions as part of the height of cut adjustment system. The extension and retraction of cylinder 114 is what causes the height adjustment stop 120 to move away from or approach limit pin 126. The adjustment holes 124 in the arcuate array of holes can be provided in a plurality of vertical rows as shown in FIG. 16 with the holes 124 in each row being slightly offset relative to the holes in the other rows. This provides incremental height adjustment settings between the settings that would otherwise be obtainable if only one arcuate row of holes 124 is used. Thus, a very efficient and cost effective height of cut adjustment system is disclosed.

Cylinder 114 obviously is powered by hydraulic fluid. As noted earlier, this fluid is supplied to cylinder 114 by the hydraulic output hose $22_o$ on drive unit 6. The fluid returns from cylinder 114 to the reservoir of the hydraulic system through the hydraulic return hose $22_r$ on drive unit 6. Thus, the hydraulic output and return hoses 22 on drive unit 6 are obviously connected or coupled in some manner to cylinder 114. Similarly, PTO 20 on drive unit 6 is connected to a gearbox 128 that provides a mechanical drive to the rotary cutting blades in cutting deck 104. See FIG. 17. The blades on cutting deck 104 could be hydraulically powered instead of being mechanically powered, in which case gearbox 128 and a connection to PTO 20 would not be used.

Preferably, cutting deck 104 is manufactured of heavy, durable 7 gauge steel. Thus, cutting deck 104 will typically weigh approximately 400 to 500 lbs. When going over a rise or bump in the ground, there are several anti-scalp rollers, wheels and/or skids 106 on cutting deck 104 to help guide cutting deck 104 over the bump. But, with such a heavy cutting deck, the anti-scalp members 106 on the sides of cutting deck 104 will often plow through or dig into the ground allowing the cutting blades to scalp. Also, anti-scalp members 106 can plow sideways into the turf during a turn leaving a furrow. This is obviously undesirable.

Figure 18:
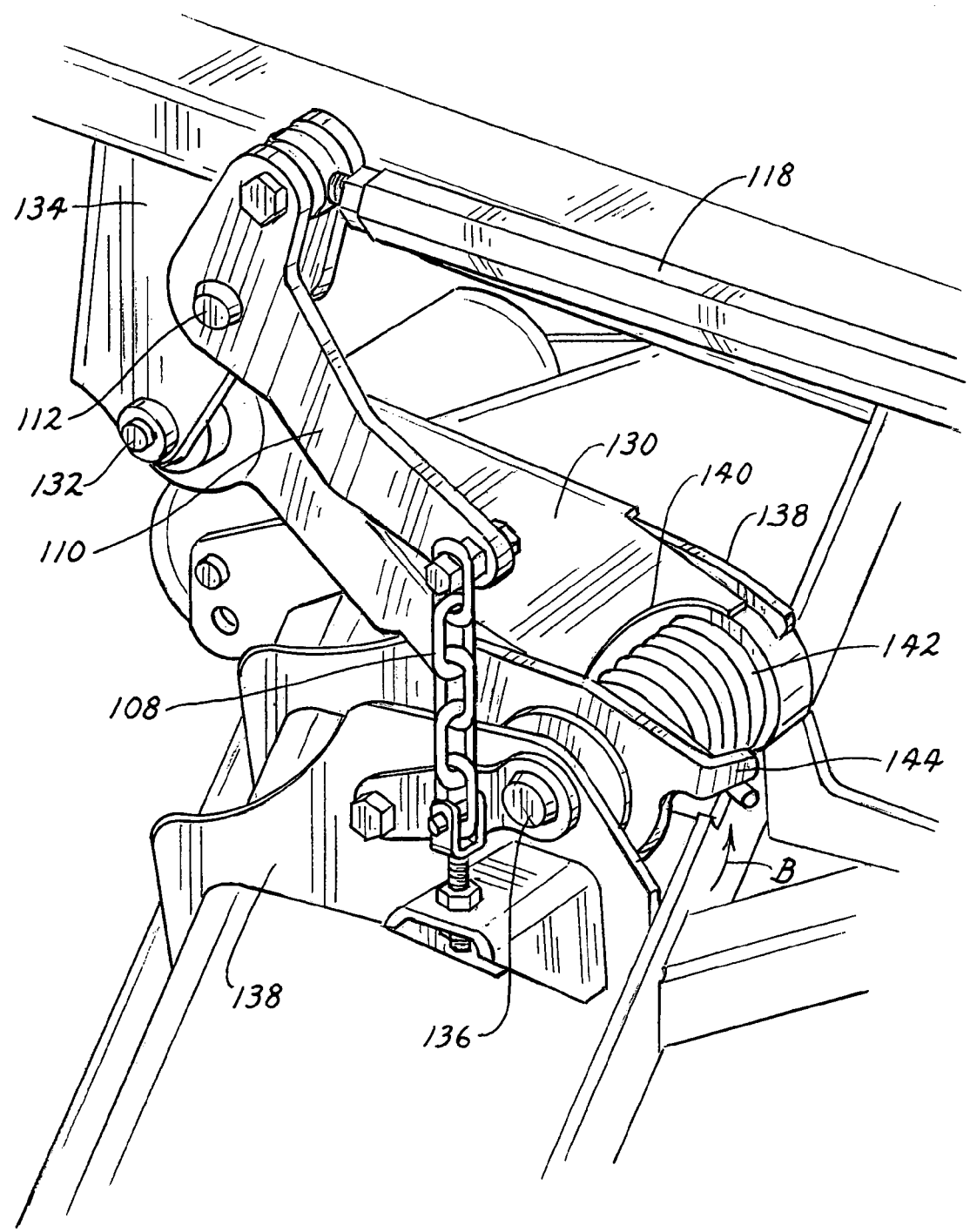
FIG. 18 is a partial perspective view of a portion of the mower unit of FIG. 16, particularly illustrating a weight transfer arm and a torsion spring for transferring some of the weight of the cutting deck to the mower frame.

In mower unit 88 of this invention, there are a pair of weight transfer arms 130 that extend between the top of cutting deck 104 and mower frame 90. One arm 130 is used on each side of cutting deck 104 at the front of mower frame 90. FIGS. 16 and 18 show one such arm 130, the other arm 130 being substantially identical. Arms 130 also provide fore-and-aft longitudinal and left and right transverse horizontal stability to cutting deck 104.

Referring to FIGS. 16 and 18, each arm 130 is pivoted at its upper end at 132 to a flange 134 on the underside of mower frame 90. The lower end of arm 130 is pivoted on a horizontal pivot shaft 136 carried on the top of cutting deck 104. Pivot shaft 136 is supported on a bracket 138 on cutting deck 104 and is arranged quite close to one of the suspension chains 108. Pivot shaft 136 extends all the way through the lower end of arm 130 to be supported on the far side in FIG. 18 by another bracket 138.

The lower end of arm 130 has a cutout or recess 140 in which a torsion spring 142 is received. Spring 142 concentrically surrounds pivot shaft 136 on which the lower end of arm 130 pivots. One end of spring 142 is anchored to the top of cutting deck 104. The other end of spring 142 abuts against the underside of a lip 144 on arm 130 or is connected to arm 130 in some other manner. The force of spring 142 will tend to push upwardly on lip 144 to rotate arm 130 in the direction indicated by the arrow B in FIG. 18. This is the direction in which the lower end of arm 130 tends to rise or lift to help transfer some of the weight of cutting deck 104 to mower frame 90.

As the height of cut of cutting deck 104 is lowered by the height of cut adjustment system, lip 144 on arm 130 will tend to further wind up spring 142. Thus, at the lowest height of cut of cutting deck 104, spring 142 will provide a maximum amount of upward bias. Preferably, the pair of springs 142 will transfer at least approximately 100 pounds of the 400 to 500 pounds of weight in cutting deck 104 to mower frame 90. This will make the anti-scalp members 106 on cutting deck 104 more effective in preventing scalping.

While two weight transfer arms 130 and two torsion springs 142 have been shown herein for use with cutting deck 104, the number of such arms 130 and springs 142 can vary. For example, four such arms 130 and four such springs 142 could be used. In this latter event, each arm 130 will connect to cutting deck 104 generally adjacent the spot where each suspension chain 108 connects to cutting deck 104.

A roll over protection system (ROPS) 146 on mower 4 comprises a U-shaped roll over bar. The ends of the bar are bolted to the same mounting posts 18 on drive frame 8 to which the mounts 46 on cab 38 had previously been bolted when tracked unit 28 was joined to drive unit 6. ROPS 146 helps protect the operator in the event mower 4 is operated inappropriately in such a way that mower 4 rolls over.

Conversion Between the Tracked Implement and the Mower

When drive unit 6 is mated with mower unit 88, the two together form a complete and operative mower 4 having a rotary cutting deck 104. However, as is clear from the above, it is relatively easy to convert mower 4 into a tracked implement 2. This is done by unbolting mower frame 90 from drive frame 8 and by disconnecting all other connections, such as the PTO 20 and the hydraulic hoses 22. Once so disconnected, mower unit 88 can simply be rolled away and stored as support wheels 98 carried on mower frame 90 allow for rolling of mower unit 88. In addition, ROPS 146 will be disconnected from mounting posts 18. A tool can be used with the rear of cutting deck 104 or mower frame 90 to help support mower unit 88 while it is being disconnected and as it is being stored during the winter.

After mower 4 is disassembled, tracked unit 28 can be rolled towards drive unit 6 using the support wheels that comprise front idler $56_f$ and trailing idler $56_r$. This is done as previously described above in the description of tracked unit 28. During this process, drive wheels 14 on drive unit 6 will be changed to smaller diameter drive wheels matching the diameter of front idler $56_f$ and trailing idler $56_r$, traction frame 30 and cab 38 will be bolted to drive frame 8, and tracks 58 will be entrained around front idler $56_f$, trailing idler $56_r$ and drive wheels 14. The conversion to tracked implement 2 is now complete save for the task of connecting PTO 20 and hydraulic hoses 22 to whatever mechanically or hydraulically powered equipment is present or carried on track frame 30 and for connecting the electrical and heater hoses for cab 38.

This invention provides for both a mower 4 and a tracked implement 2 that convert from one to the other using a single common drive unit 6. Thus, this invention provides effective cost management for users of such equipment as it will be less expensive to purchase the three components of this invention, namely drive unit 6, mower unit 88 and tracked unit 28, than purchasing two complete, stand alone, single purpose machines. Moreover, implement 2 provided by this invention is one that is a true tracked unit and is not simply a mower that is somehow fitted out with a different grooming or working device. In implement 2 of this invention, the track geometry, weight distribution, etc., are all design to give optimum performance as a tracked implement.

Yet, despite the obvious cost savings, the conversion between mower 4 and implement 2 can be quickly done. The number and types of steps required to effect this conversion have been kept to a minimum. Cab 38 is part of implement 2 and only needs to be bolted at the rear of cab 38 to drive frame 8 of drive unit 6. Front idler 56$_f$ and trailing idler 56$_t$ are released to move to their track removal and installation position by releasing only a single nut 72 from a bolt 70. The total time required to make a complete conversion will be only a couple of hours or so.

Various modifications of this invention will be apparent to those skilled in the art. While tracks 58 are preferably entrained around rotatable rubber tired wheels 14, 56$_f$ and 56$_t$, such wheels could be replaced by toothed sprockets when converting mower 4 to tracked implement 2. However, one advantage of using wheels instead of sprockets is that tracked unit 28 can simply be rolled away for storage once tracks 58 are removed.

Thus, this invention is to be limited only by the appended claims.

I claim:

1. A mower that converts into a tracked implement, which comprises:
   (a) a drive unit, which comprises:
      (i) a drive frame;
      (ii) a prime mover carried on the drive frame;
      (iii) an operator's station on the drive frame for carrying an operator;
      (iv) a pair of ground engaging drive wheels on the drive frame with one drive wheel located on each side of the drive frame for driven rotation about a common rotational drive axis; and
      (v) a control system on the drive frame adjacent the operator's station for operating the drive wheels;
   (b) a mower unit, which comprises:
      (i) a mower frame;
      (ii) at least one ground engaging support wheel carried on the mower frame; and
      (iii) a grass cutting unit carried on the mower frame;
   (c) a tracked unit, which, comprises:
      (i) a track frame;
      (ii) a plurality of rotatable support idlers carried on the track frame with at least one support idler located on each side of the track frame;
      (iii) a device carried on the track frame to perform a ground or turf grooming or working operation other than grass cutting; and
      (iv) a pair of endless ground engaging tracks with one track located adjacent each side of the track frame, wherein each track is entrained around and connects a rotatable drive member carried on the drive frame and located on the drive axis on one side of the drive frame to the at least one support idler on a corresponding side of the track frame; and
   (d) wherein either the mower unit or the tracked unit are alternatively usable with the drive unit to provide, respectively, either a mower for cutting grass or a tracked implement for performing the non-grass cutting ground or turf grooming or working operation.

2. The mower of claim 1, wherein the rotatable drive members carried on the drive frame when the tracked unit is used with the drive unit are different from the drive wheels carried on the drive frame when the mower unit is used with the drive unit.

3. The mower of claim 1, wherein the rotatable drive members carried on the drive frame when the tracked unit is used with the drive unit are drive wheels having a smaller diameter than the drive wheels carried on the drive frame when the mower unit is used with the drive unit.

4. The mower of claim 3, wherein the rotatable support idlers carried on the track frame are support wheels having the smaller diameter of the drive wheels carried on the drive frame when the tracked unit is used with the drive unit.

5. The mower of claim 1, wherein the ground or turf grooming or working operation performed by the device on the tracked unit is chosen from a group of operations comprising snowblowing, surface brushing, and plowing.

6. The mower of claim 1, wherein the grass cutting unit comprises at least one rotatable cutting blade that is rotatable about a substantially vertical axis in a horizontal cutting plane.

7. The mower of claim 6, wherein the cutting blade(s) are located beneath a cutting deck carried on the mower frame.

8. The mower of claim 7, wherein the cutting deck comprises a ground following cutting deck that is movable relative to the mower frame in response to changes in ground contour.

9. The mower of claim 7, wherein the cutting deck is suspended from the mower frame by a plurality of flexible members.

10. The mower of claim 9, wherein the flexible members extend from the cutting deck to a plurality of pivotal height of cut adjustment links carried on the mower frame.

11. The mower of claim 1, wherein the drive frame includes a power takeoff shaft for providing mechanical power from the prime mover to the grass cutting unit of the mower unit or to the device of the tracked unit depending upon whether the mower unit or the tracked unit is used with the drive unit.

12. The mower of claim 11, wherein the drive frame includes a pair of hydraulic hoses carried on the drive frame for supplying pressurized hydraulic fluid to the mower unit or to the tracked unit depending upon whether the mower unit or the tracked unit is used with the drive unit and for returning the pressurized hydraulic fluid to the drive unit.

13. The mower of claim 1, wherein the operator's station includes a seat for a seated operator.

14. The mower of claim 13, further including a floorboard for supporting the operator's feet when the operator is seated on the seat.

15. The mower of claim 14, wherein the floorboard is part of the mower frame or the track frame depending upon whether the mower unit or the tracked unit is used with the drive unit.

16. The mower of claim 14, further including a cab for substantially enclosing the operator's station and the floorboard on the track frame when the tracked unit is used with the drive unit.

17. The mower of claim 16, wherein the cab is carried on the track frame.

18. The mower of claim 17, wherein the cab is releasably secured to the drive frame at a pair of mounting posts carried on the drive frame.

19. The mower of claim 18, wherein a roll over protection system is releasably secured to the mounting posts on the drive frame in place of the cab when the mower unit is used with the drive unit in place of the tracked unit.

20. The mower of claim 1, wherein either the mower frame or the track frame is releasably secured to the drive frame to releasably fix either the mower frame or the track frame in a rigid manner to the drive frame when either the mower unit or the tracked unit is used with the drive unit.

21. The mower of claim 20, further including an upwardly and rearwardly extending cab carried on the track frame for enclosing the operator's station on the drive frame when the tracked unit is used with the drive unit.

22. The mower of claim 1, wherein the drive wheels can be driven in forward and reverse and independently of one another to provide zero radius turn capability for the drive unit.

* * * * *